US012613137B2

(12) United States Patent
Qiang et al.

(10) Patent No.: US 12,613,137 B2
(45) Date of Patent: Apr. 28, 2026

(54) APPARATUS AND METHOD FOR RELIABLE DETECTION OF TEMPERATURE READING

(71) Applicant: CANON MEDICAL SYSTEMS CORPORATION, Tochigi (JP)

(72) Inventors: Yi Qiang, Vernon Hills, IL (US); Shuoxing Wu, Vernon Hills, IL (US); Motohiro Inoue, Otawara Tochigi (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 284 days.

(21) Appl. No.: 18/339,850

(22) Filed: Jun. 22, 2023

(65) Prior Publication Data

US 2024/0426665 A1 Dec. 26, 2024

(51) Int. Cl.
*G01J 5/00* (2022.01)
*G01J 5/02* (2022.01)
*G01J 5/06* (2022.01)

(52) U.S. Cl.
CPC ........... *G01J 5/0003* (2013.01); *G01J 5/0205* (2013.01); *G01J 5/027* (2013.01); *G01J 5/064* (2022.01)

(58) Field of Classification Search
None
See application file for complete search history.

(56) References Cited

U.S. PATENT DOCUMENTS

| | | | | |
|---|---|---|---|---|
| 5,333,784 A | * | 8/1994 | Pompei | G01J 5/049 374/E13.003 |
| 2003/0222738 A1 | * | 12/2003 | Brown | H01P 1/202 333/262 |
| 2004/0258207 A1 | | 12/2004 | Okamura et al. | |
| 2009/0224160 A1 | * | 9/2009 | Roybal | G01T 1/2921 250/336.1 |
| 2014/0348201 A1 | | 11/2014 | Shapland et al. | |
| 2015/0090889 A1 | * | 4/2015 | Kuroda | G01T 1/205 250/362 |
| 2016/0266260 A1 | | 9/2016 | Preston | |
| 2020/0292717 A1 | | 9/2020 | Morys | |

FOREIGN PATENT DOCUMENTS

CN 208282862 U 12/2018

* cited by examiner

*Primary Examiner* — Erica S Lin
(74) *Attorney, Agent, or Firm* — Oblon, McClelland, Maier & Neustadt, L.L.P.

(57) ABSTRACT

A device and method in which image scanning circuitry acquires imaging information of an object, and thermal detection circuitry is disposed in close proximity to the image scanning circuitry. The thermal detection circuitry estimates a temperature of the image scanning circuitry by calculating a thermal transfer of heat passing from the image scanning circuitry to the thermal detection circuitry.

17 Claims, 14 Drawing Sheets

804

802

804a

816

814

810

812

900

Scintillator
902

Photosensor  904
ASIC  906

PCB          T Probe        Connector
908           920            910

900

Scintillator
902

Photosensor    904
PCB  908

ASIC              T Probe       Connector    910
906               920

900

Scintillator    902

Photosensor    904
PCB    908

ASIC    906

Connector    910

T Probe
920

900

Scintillator    902

Photosensor    904
PCB 1  908a

T Probe
920

Connector    910

ASIC/FPGA
906

PCB 2    908b

1200

Cathode        1202

Semiconductor Detector        1204

ASIC        1208

Connector        1210

PCB        T Probe 1206        1220

1200

Cathode        1202

Semiconductor Detector        1204

PCB        1206

ASIC        Connector        1210

1208        T Probe

1220

1200

Cathode    1202

Semiconductor Detector    1204

PCB    1208

Connector    1210

ASIC    1206

T Probe    1220

APPARATUS AND METHOD FOR RELIABLE DETECTION OF TEMPERATURE READING

BACKGROUND

Field

The present disclosure is directed to an apparatus and method of determining temperature in a medical imaging system for real-time thermal correction.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In positron emission tomography (PET) imaging, a tracer agent is introduced into the patient, and the physical and bio-molecular properties of the agent cause it to concentrate at specific locations in the patient's body. The tracer emits positrons, resulting in annihilation events occurring when the positron collides with an electron to produce two gamma rays (at 511 keV) traveling at substantially 180 degrees apart.

PET imaging systems use detectors positioned around the patient to detect coincidence pairs of gamma rays. A ring of detectors can be used in order to detect gamma rays coming from each angle. Thus, a PET scanner can be substantially cylindrical to maximize the capture of the isotropic radiation. A PET scanner can be composed of several thousand individual crystals (e.g., Lutetium Orthosilicate (LYSO) or other scintillating crystal) which are arranged in two-dimensional scintillator arrays that are packaged in modules with photodetectors to measure the light pulses from respective scintillation events. For example, the light from respective elements of a scintillator crystal array can be shared among multiple photomultiplier tubes (PMTs) or can be detected by silicon photomultipliers (SiPMs) having a one-to-one correspondence with the elements of a scintillator crystal array.

A typical PET system uses scintillation crystals coupled with photon sensors to detect the 511 keV gamma rays from positron annihilation. Given the requirements on spatial resolution, both the crystals and the photon sensors have a fine pitch. Multiple arrays of crystal and photon sensors (e.g. SiPM) are coupled to an electronics board equipped with signal processing chips (application-specific integrated circuits) to obtain the event information of position, energy, and arrival time. FIG. 1 is a graph of gain and temperature for different voltages. As shown in FIG. 1, the breakdown voltage of a SiPM is sensitive to temperature. Therefore, the bias voltage to the SiPM needs to be compensated based on its temperature to maintain a stable gain and detection efficiency.

In a photon counting computed tomography (PCCT) system, a photon-counting detector (PCD) is a detection component. PCDs possess many inherent advantages over other conventional CT detectors because of the fundamental differences in the physical mechanism responsible for photon detection and signal generation. In particular, PCDs use a direct conversion technology for X-ray detection that does not require a scintillator layer as in energy-integrating detectors (EIDs). The semiconductor detector material of the PCD directly converts X-ray photons into electron hole pairs.

Semiconductor materials used in PCDs can include cadmium telluride (CdTe) or cadmium zinc telluride (CZT), although other materials, such as silicon and gallium arsenide, also have been used.

In a PCCT system, the semiconductor-based detector uses direct conversion and is designed to resolve the energy of the individual incoming photons and generate measurement of multiple energy bin counts for each integration period. The semiconductor-based detector is bonded to application-specific integrated circuits (ASICs). The electrodes across the semiconductor materials (e.g. CdTe/CZT) of the detector provide an electric field to collect the electrons and holes produced inside. Then the electric pulses at the electrodes are readout by the downstream ASICs, which provide charge integration, pulse shaping, and energy level determination. FIG. 2 is a plot of the electron mobility inside the CdTe material as a function of temperature. As shown in FIG. 2, the charge mobility in CdTe/CZT is sensitive to temperature. Therefore, CdTe/CZT temperature needs to be stabilized during CT scans, or the temperature needs to be monitored, so that proper correction can be applied to the acquired data.

In particular, referring back to FIG. 1, a SiPM gain varies with its working temperature so that correction needs to be performed to determine the true energy deposited from the 511 keV gamma rays in a PET system using SiPMs. Further, as shown in FIG. 2, the electron mobility inside the CdTe material is shown as a function of the temperature. Electron mobility affects the charge collection time, and thus affects counting performance of a PCCT using CdTe as the X-ray absorber.

In most detector systems, in order to improve a detector's detection efficiency and reduce dosage, the detector elements are tightly tiled, which leaves no room for thermal probes. Instead, the detector temperature is measured by nearby thermal probes, either as a component inside the ASIC, or mounted on a printed circuit board (PCB) on which the ASIC is mounted. That reading by a near-by thermal probe is sufficient for a system in equilibrium. However, in a setting in which ambient temperature fluctuates or in a system with varying power consumption, the reading from the thermal probe will substantially not reflect the actual temperature at the detector element. FIG. 3 illustrates heat transfer form an ASIC to a detector. As shown in FIG. 3, the actual temperature at the detector will differ from the reading of the temperature probe because it takes time for the heat to transfer between two points, e.g., from the ASIC 302 to the detector 304.

Such an error in temperature measurement will either cause the temperature control of the detector 304 to be less stable, contribute to an error in temperature compensation, or lead to inaccurate correction of data, and finally will affect the detector as well as the overall system performance.

FIG. 4 shows plots illustrating how a lag in temperature reading affects a PET detector's performance. The bias voltage of the SiPM is compensated for based on a measured temperature. In a CT gantry with a fluctuating temperature, when there is a little delay between the measured temperature and the actual SiPM temperature, the SiPM will be inaccurately biased, which causes the photopeak to shift. A similar lag in temperature occurs in the case of PCD performance.

Accordingly, it is one object of the present disclosure to provide methods and systems for obtaining a reliable detector temperature reading in a medical imaging system.

SUMMARY

One aspect of the present disclosure is a detection apparatus that includes a thermal probe configured to measure a temperature at a particular location adjacent to a radiation sensor that outputs a detection signal in response to incident radiation; and processing circuitry configured to estimate a temperature of the radiation sensor based on the measured temperature from the probe.

A further aspect is a method, that includes receiving, from a thermal probe, a measured temperature at a particular location adjacent to a radiation sensor that outputs a detection signal in response to incident radiation; and estimating, by processing circuitry, a temperature of the radiation sensor based on the measured temperature.

A further aspect is a detection system, that includes a board on which is mounted: a radiation sensor configured to output a detection signal in response to incident radiation, signal processing circuitry arranged adjacent to the radiation sensor and configured to process the detection signal output by the radiation sensor, and a thermal probe configured to measure a temperature at a particular location adjacent to the radiation sensor; and processing circuitry configured to receive the temperature measured by the thermal probe, and estimate a temperature of the radiation sensor based on the measured temperature.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
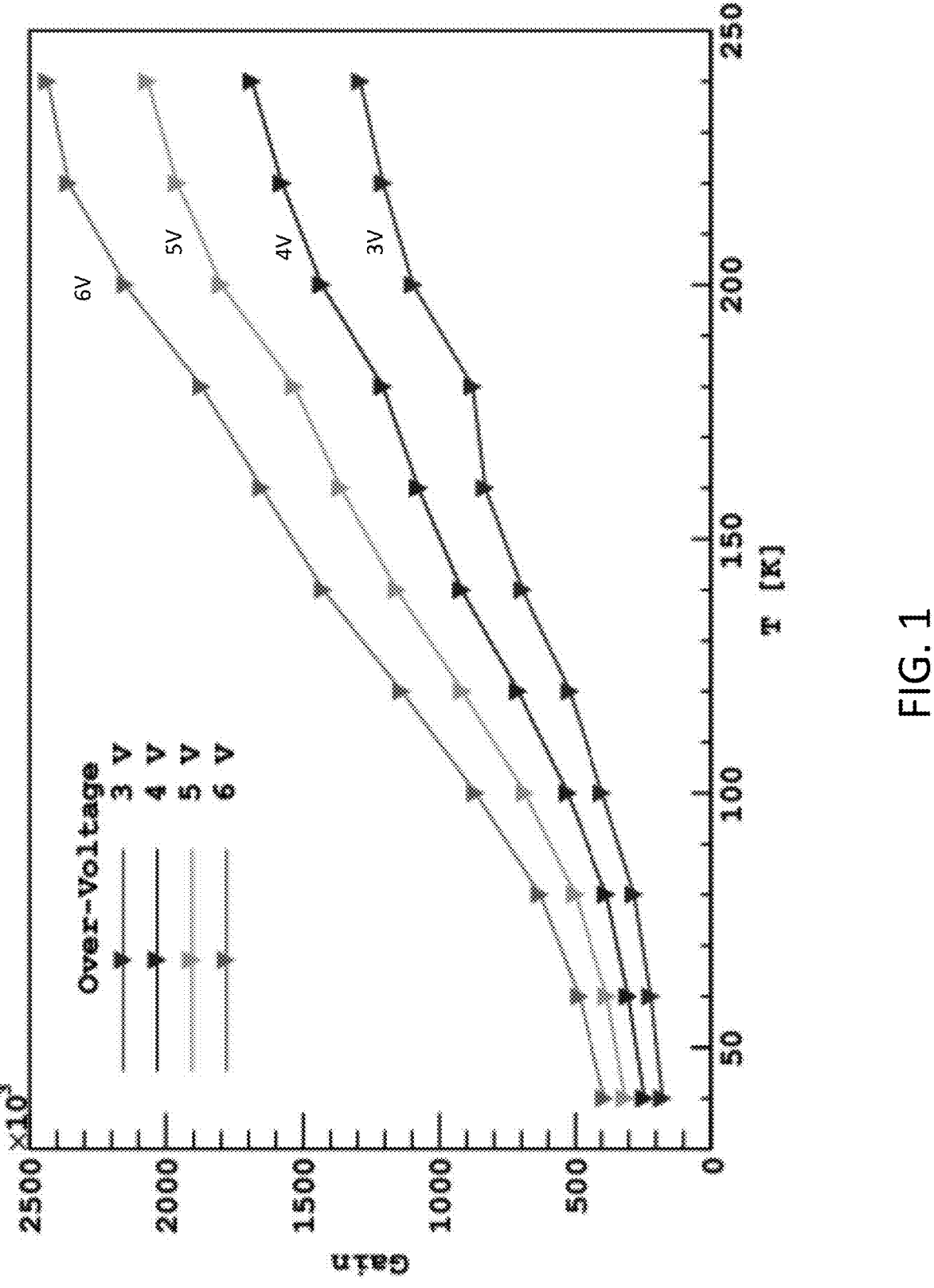
FIG. 1 is a graph of gain and temperature for different voltages.
Figure 2:
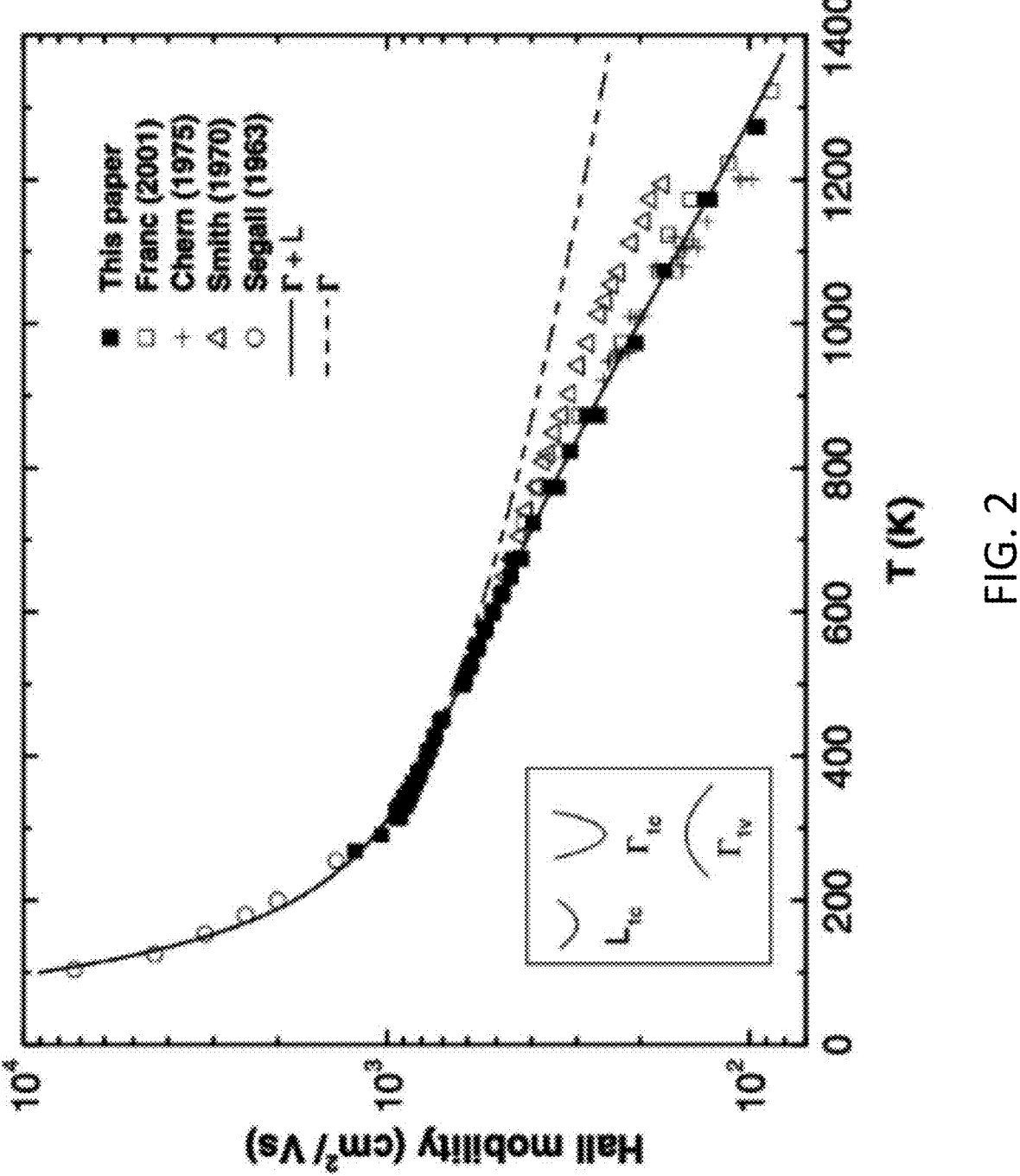
FIG. 2 is a plot of the electron mobility inside the CdTe material as a function of temperature.

In the drawings, like reference numerals designate identical or corresponding parts throughout the several views. Further, as used herein, the words "a," "an" and the like generally carry a meaning of "one or more," unless stated otherwise. Furthermore, the terms "approximately," "approximate," "about," and similar terms generally refer to ranges that include the identified value within a margin of 20%, 10%, or preferably 5%, and any values therebetween.

A disclosed solution provides a method of better temperature estimation for hard-to-probe temperature sensitive components in a detector system The disclosed method provides a reliable measurement of temperature of a certain component, particularly when a temperature sensor is mounted in a different location than the temperature-sensitive component. The method is used to compensate for the location difference. In one embodiment, the disclosed method can be implemented as a software program that is executed on an existing microprocessor or FPGA and can include a digital or analog filter.

$$Q = \frac{dQ}{dt} = -kA \cdot \frac{dT}{dx}$$

Figure 5:
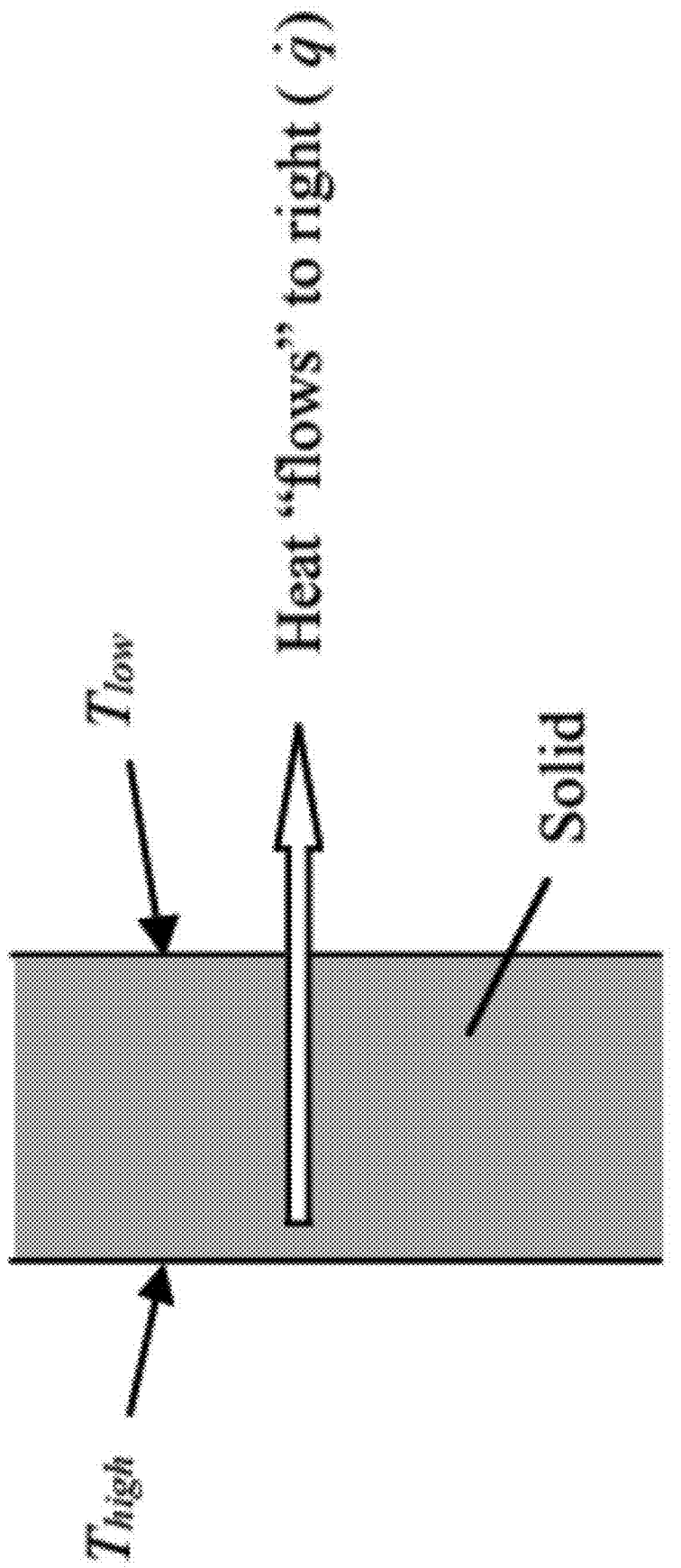
FIG. 5 illustrates the transfer of heat in a solid.

The disclosed method is a signal processing method that estimates the heat transfer between the two locations in order to achieve better accuracy. FIG. 5 illustrates the transfer of heat in a solid. As shown in FIG. 5, the transfer of heat in a solid 502 is governed by Fourier's Law:

where Q is the amount of heat, k is thermal conductivity of the solid 502, and A is the area of the cross-section of the solid 502.

Figure 3:
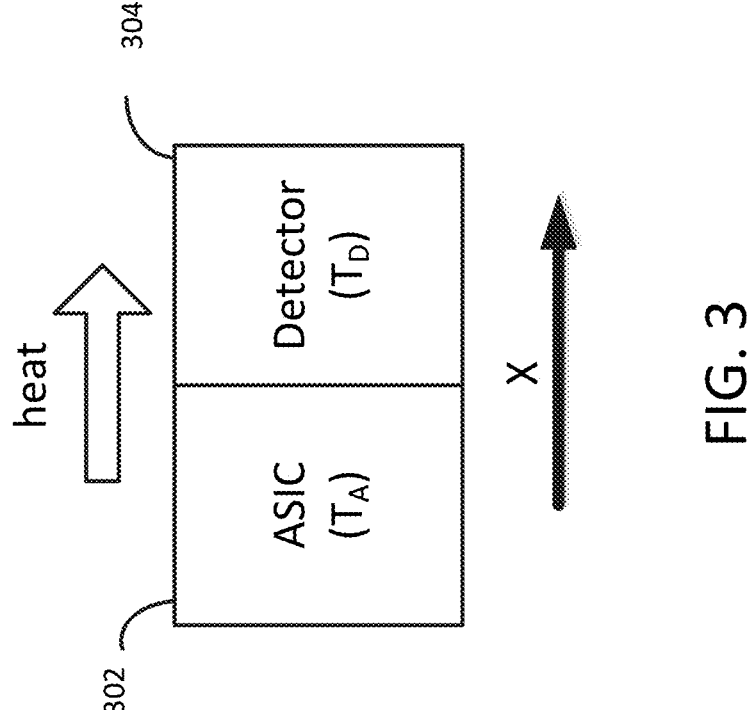
FIG. 3 is a diagram to illustrate conductive heat transfer in an ASIC-detector structure.
Figure 4:
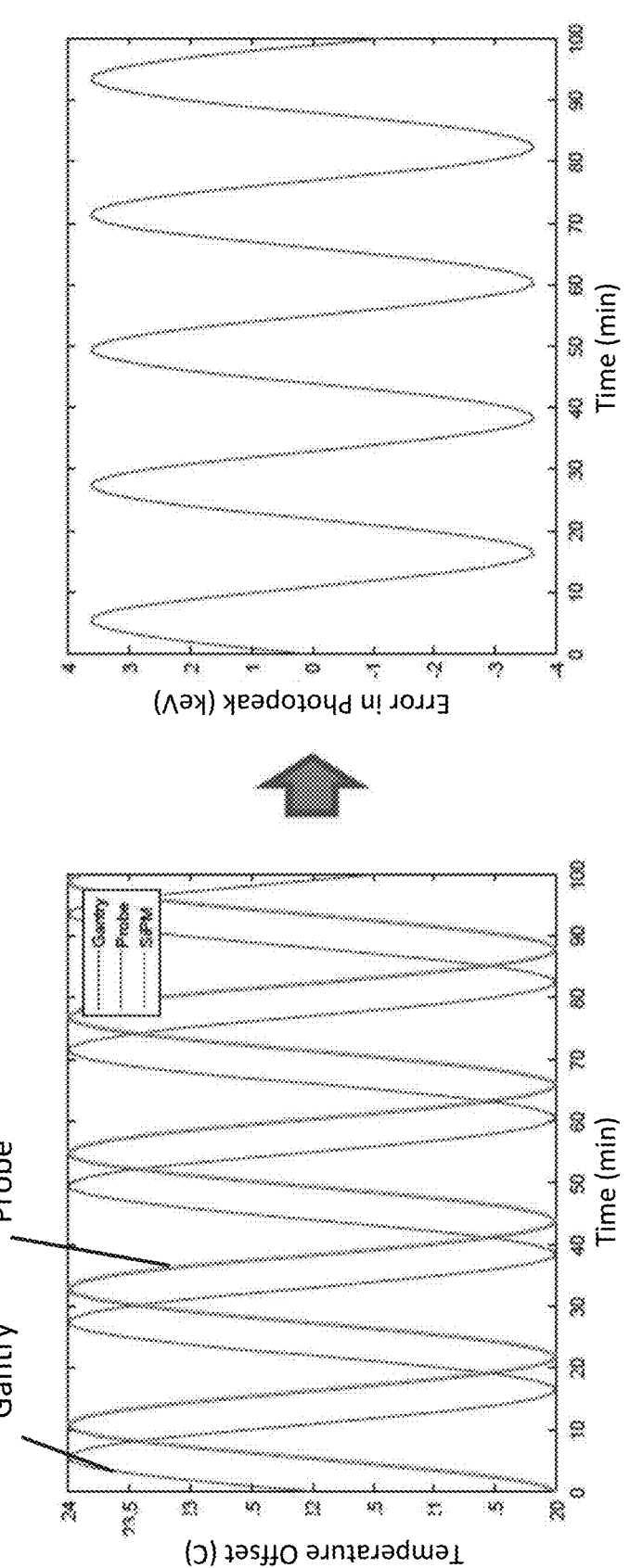
FIG. 4 shows plots illustrating how lagging in temperature reading affects a PET detector's performance.

Referring back to FIG. 3, for a case in which the downstream target (detector 304), $T_D$, is a solid device that is in close contact with a upstream heat source (ASIC 302), $T_A$, the change of the target device's temperature, can be expressed as:

$$\frac{dT_D}{dt} \cdot C = \frac{dQ}{dt} = -kA \cdot \frac{dT}{dx} = -K(T_D - T_A),$$

where C is the thermal mass of the target device, and K is the normalized thermal conductivity.

Assuming that $T_A$ of the upstream heat source suddenly changes from 0 to 1 at t=0, the temperature of the downstream target device, $T_D$, can be determined as:

$$T_D(t) = \left(1 - e^{\frac{K}{C}t}\right).$$

Here, the impulse response function is the derivative:

$$H(t) = \frac{K}{C} e^{\frac{K}{C}t}.$$

For such a linear system, the temperature of the downstream target device, $T_D$, with any given temperature history of the upstream heat source, $T_A$, can be generalized as a convolution:

$$T_D(t) \otimes H(t).$$

When the heat path is longer, a more complicated differential equation can be solved with thermal characteristics along the heat path x:

$$C(x)\frac{\partial T(x,t)}{\partial t} = -\frac{\partial\left(\frac{\partial Q(x,t)}{\partial t}\right)}{\partial x} + Q^*(x,t) = K(x)\frac{\partial^2 T(x,t)}{\partial x^2} + Q^*(x,t),$$

where Q*(x, t) is the heat generated by elements along the path.

Nevertheless, a solution can be generally formulated into a convolution of input temperature and a more convolved impulse response function:

$$T_D(x,t) = T_A(t) \otimes H(x,t),$$

where x represents the location of interest.

Figure 6:
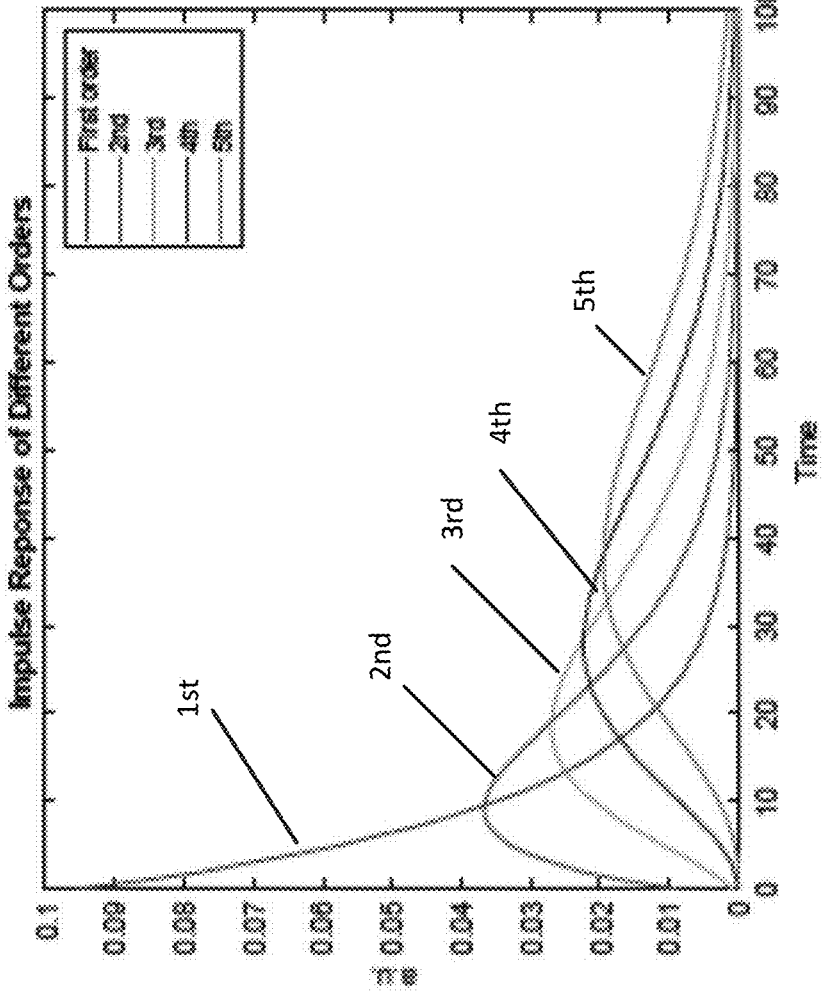
FIG. 6 is a graph of a convolved impulse response function of different orders.

FIG. 6 is a graph of a convolved impulse response function of different orders.

Thus, the disclosed real-time signal processing method applies an approximated impulse response function to the measured temperature from the upstream heat source, and the output represents the estimated temperature at downstream target device. A similar method can also be applied to estimate temperature at an upstream heat source using readings from downstream device, e.g., using a deconvolution kernel for signal processing.

Figure 7:
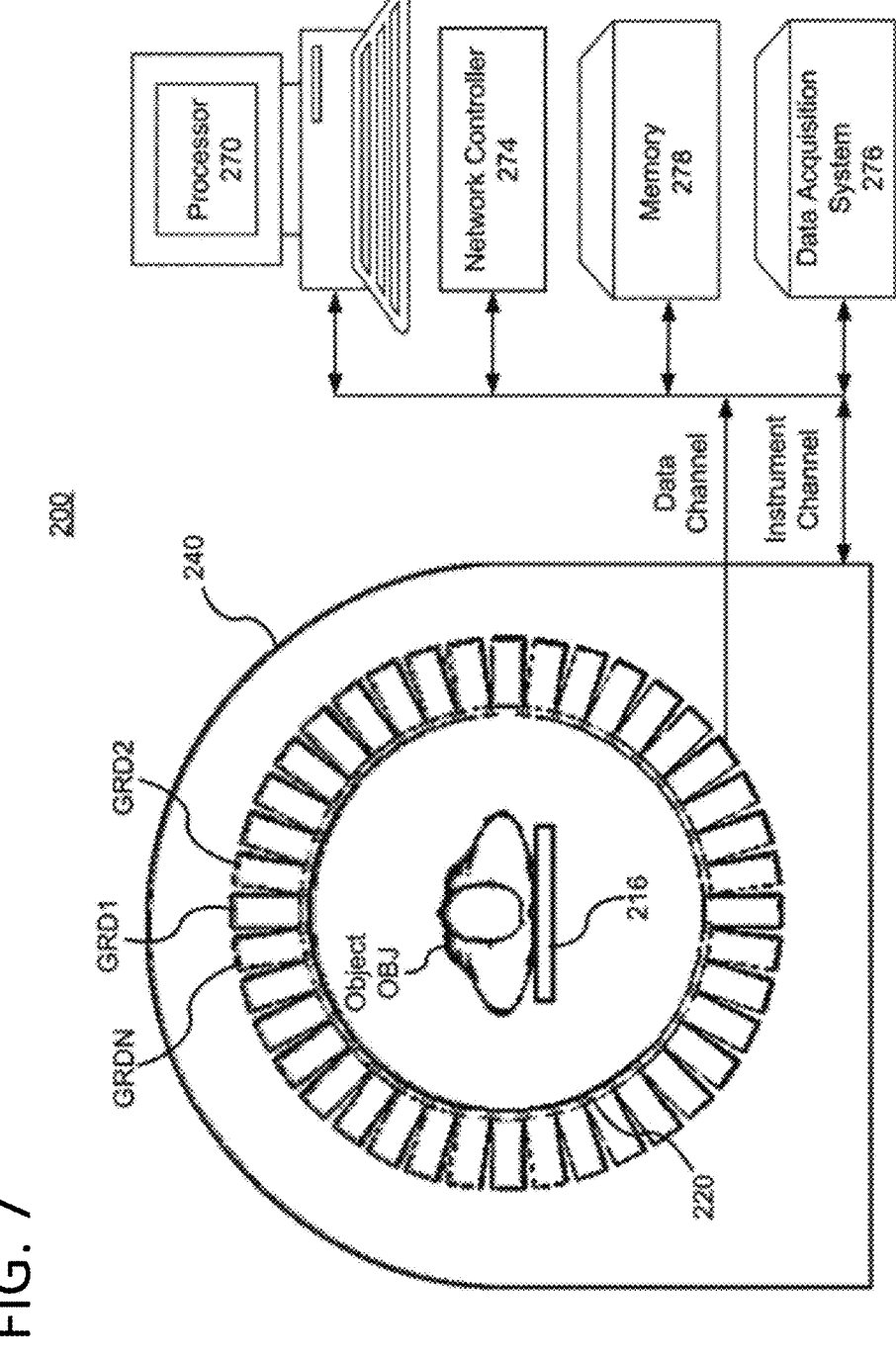
FIG. 7 is a schematic view of a PET scanner.

FIG. 7 is a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIG. 7. The detector crystals can be scintillator crystals, which have individual scintillator elements arranged in a two-dimensional array.

In particular, FIG. 7 shows an example of the arrangement of the PET scanner 200, in which the object OBJ to be imaged rests on a table 216 and the GRD modules GRD1 through GRDN are arranged circumferentially around the object OBJ and the table 216. The GRDs can be fixedly connected to a circular component 220 that is fixedly connected to the gantry 240. The gantry 240 houses many parts of the PET imager. The gantry 240 of the PET imager also includes an open aperture through which the object OBJ and the table 216 can pass, and gamma-rays emitted in opposite directions from the object OBJ due to an annihilation event can be detected by the GRDs and timing and energy information can be used to determine coincidences for gamma-ray pairs.

A processor 270 can be configured to perform various steps of methods of CT imaging. The processor 270 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 270 can execute a computer program including a set of computer-readable instructions that perform various steps of CT imaging, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 278 can be a hard disk drive, CD-ROM drive, DVD drive, FLASH drive, RAM, ROM or any other electronic storage known in the art.

The network controller 274, such as an Intel Ethernet PRO network interface card from Intel Corporation of America, can interface between the various parts of the PET imager. Additionally, the network controller 274 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

A data acquisition system 276 can be used to maintain data obtained by the PET imager.

Figure 8:
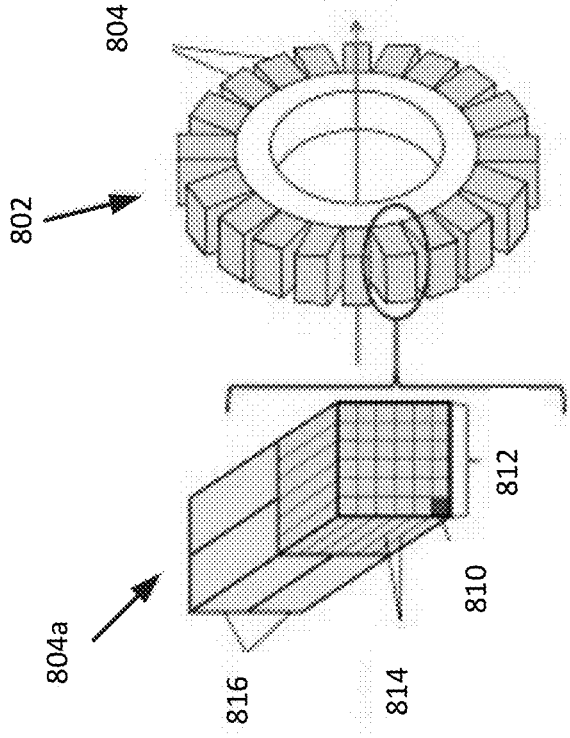
FIG. 8 shows a non-limiting example of a PET system that is configured with detector modules arranged in an annular shape.

FIG. 8 shows a non-limiting example of a PET system that is configured with detector modules 804 (i.e., gamma-ray detectors (GRD)) arranged in an annular shape. According to one implementation, the detector ring 802 includes 40 GRDs. In another implementation, there are 48 GRDs, and the higher number of GRDs is used to create a larger bore size for the PET scanner 200.

Each of the detector modules 804*a* can include several arrays of detector elements. The GRDs include scintillator crystal arrays 812 for converting the gamma rays into scintillation photons (e.g., at optical, infrared, and ultraviolet wavelengths), which are detected by photodetectors. Slits 814 can be cut into scintillation crystal and filled with reflective material. In the non-limiting example illustrated in FIG. 8, the photodetectors are photomultiplier tubes 816 (PMTs) that are much bigger than the respective scintillator crystal elements 810. In one preferred embodiment, the photodetectors are silicon photomultipliers (SiPMs) that can have a detection cross-section that approximates the cross-sectional area of the individual scintillator crystal elements 810, creating a one-to-one correspondence between the crystals and the photodetectors.

Photosensor or semiconductor detectors can be arranged on an ASIC or mounted on a printed circuit board (PCB). Although photosensors or semiconductor detectors can be arranged on an ASIC to improve the detector performance, in preferred embodiments, photosensors or semiconductor detectors are hosted on two sides of a PCB, or on different PCBs for ease of assembly.

Figure 9A:
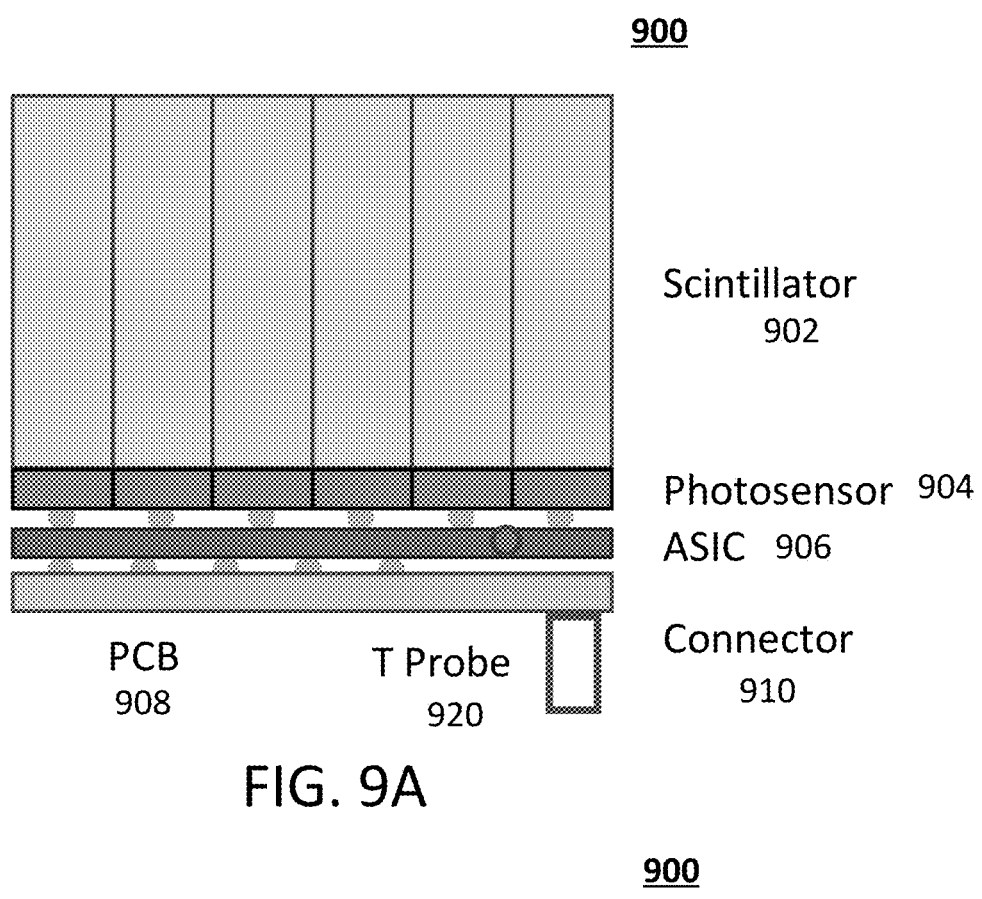
FIGS. 9A, 9B, 9C, and 9D are alternative arrangements of photosensors for a detector.

FIGS. 9A, 9B, 9C, and 9D are alternative arrangements of photosensors for a detector. The detector 900 includes a scintillator 902, a photosensor 904, and a readout integrated circuit 906. In FIG. 9A, the photosensor 904 is arranged on the ASIC 906 The ASIC 906 may be mounted on a PCB 908. A connector 910 is arranged on the PCB 908 for connecting the detector 900 to a detection system. In FIG. 9A, a thermal probe 920 is arranged in the ASIC 906. The scintillator 902 is a material which converts X-ray photons to light photons. The photosensor 904 is a 2D arrangement of photodiode elements or pixels, each generating a current in response to the absorption of light originating from the scintillator 902. That is, the photosensor 904 converts light into an electrical current. The readout ASIC 906 is an integrated semiconductor device which converts the current generated by each photosensor pixel at many angular positions (as the detector rotates around the patient) into a digital signal representation. The acquired data is then further processed by an image signal processor or image reconstructor.

Figure 9B:
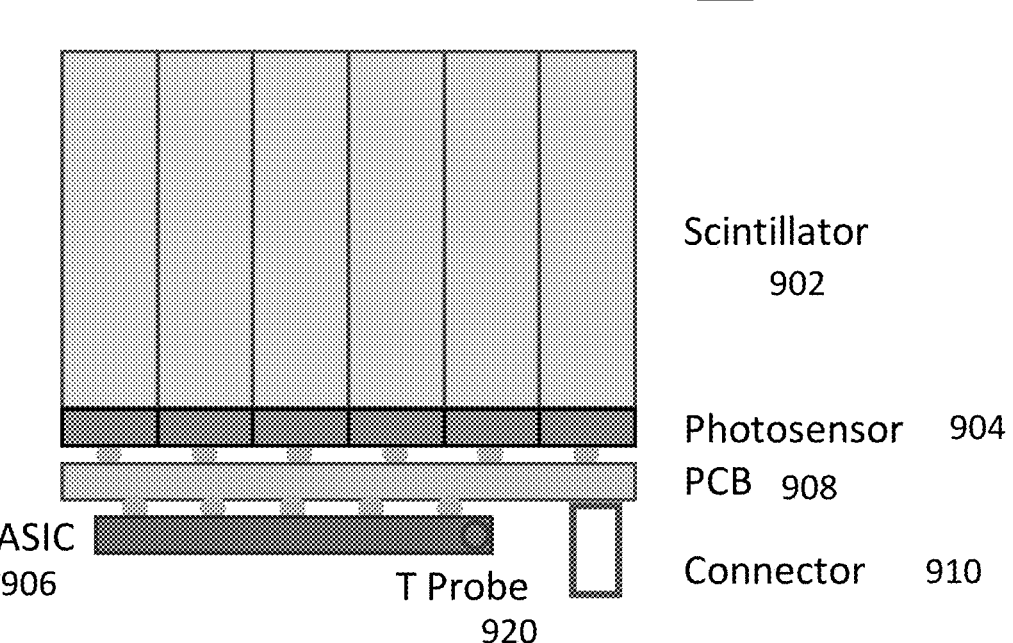

In FIG. 9B, the photosensor 904 is arranged on a side of the PCB 908, and the ASIC 906 is mounted to a second side of the PCB 908. The PCB 908 has a connector 910 for connecting the detector 900 to the detection system. A thermal probe 920 is arranged in the ASIC 906.

Figures 9C, 9D:
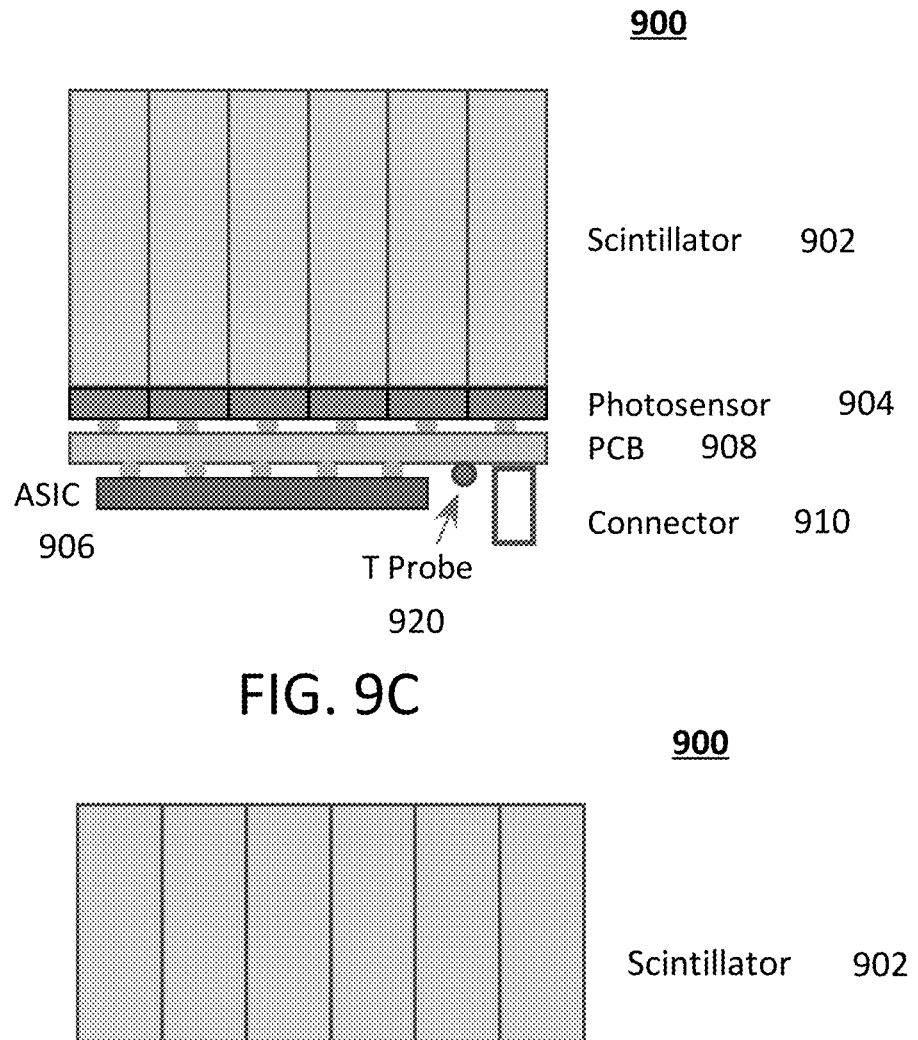

In FIG. 9C, the photosensor 904 is arranged on a side of the PCB 908, and the thermal probe 920 is arranged on a second side of the PCB 908. The ASIC 906 is mounted on the second side of the PCB 906, but separate from the thermal probe 920.

In FIG. 9D, the photosensor 904 is arranged on a side of a first PCB 908*a*, and the ASIC 906 is mounted on a second PCB 908*b*. The two PCBs 908*a*, 908*b* can be connected to each other by the connector 910. In one embodiment, the ASIC 906 is a field programmable gate array (FPGA). The thermal probe 920 is arranged on the first PCB 908*a* on a second side.

CT scanners generally use solid state detectors and share similar third-generation rotate-rotate designs. PCDs possess many inherent advantages over other conventional CT detectors because of the fundamental differences in the physical mechanism responsible for photon detection and signal generation.

In particular, PCDs use a direct conversion technology for X-ray detection that does not require a scintillator layer as in energy-integrating detectors (EIDs). Since PCDs use direct conversion technology, detector pixels can be designed without a mechanical separation (septum), which inherently improves the geometric dose efficiency. One specific aspect of PCCT is its ability to allow simultaneous acquisition of high-spatial-resolution and multienergy images.

Figure 10:
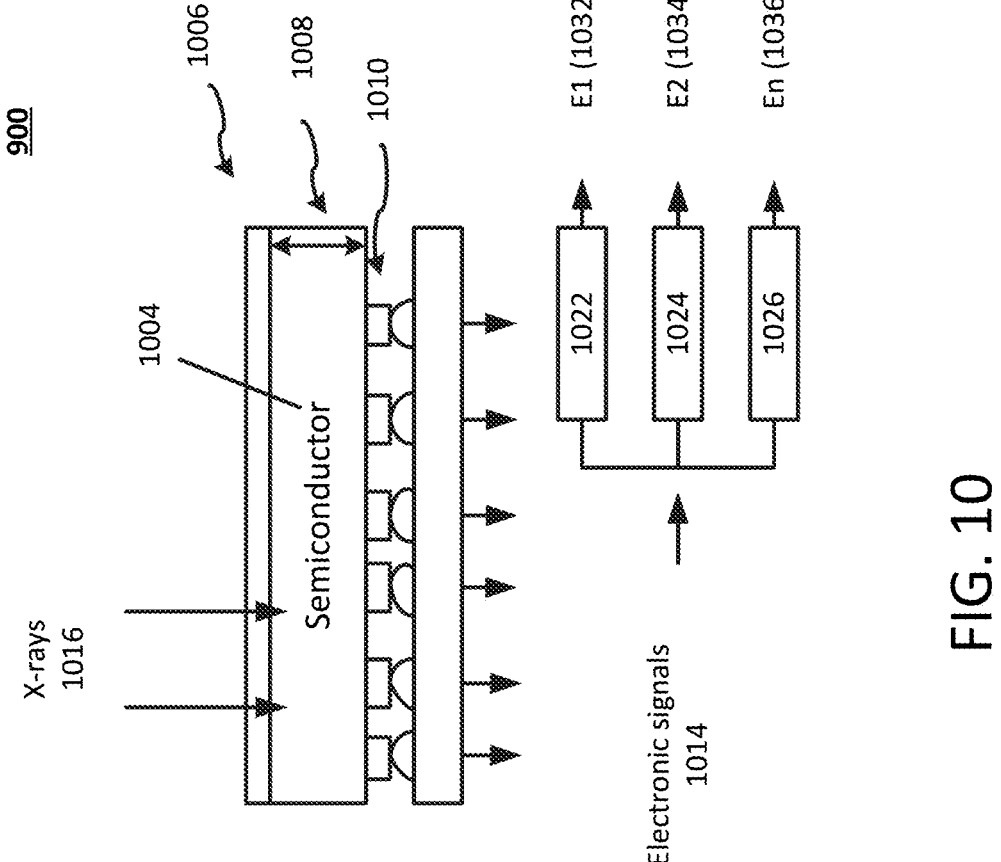
FIG. 10 is a block diagram of a photon-counting detector (PCD)

FIG. 10 is a block diagram of the photon-counting detector (PCD) 908. The semiconductor detector material 1004 of the PCD directly converts X-ray photons 1016 into electron hole pairs. A PCD 1008 includes a cathode 1006, semiconductor material 1004 and an anode 1010. With a bias voltage 1008 applied throughout the semiconductor, electrons travel to and are collected by the anode 1010 to generate electronic signals 1014.

Because electronic noise usually is detected as a low-amplitude signal, it is interpreted by a PCD as a photon with energy located at the lower end of a typical X-ray spectrum. Thus, by setting a low-energy threshold to be slightly higher than the energy level associated with the electronic noise signal amplitude (e.g., 25 keV), electronic noise can be excluded readily from the measured count data. Since a signal with an energy level lower than this threshold is very unlikely to be caused by a primary photon transmitted through the imaging object of interest, it typically does not contain meaningful information vital to any clinical task. However, electronic noise can have some effect on the detected energy spectrum, because its signal amplitude is added to that of a detected photon, which consequently artificially increases the energy of the detected photon.

PCDs count the number of individual photons that exceed a specified energy level. For a given X-ray photon, the pulse height of the signal created by the charge collection at the anode 1010 is proportional to the energy of the photon. Thus, the electronic signal 1014 from a PCD carries with it energy information about each individually detected photon. The output signal from a PCD is processed by multiple electronic comparators and counters 1022, 1024, and 1026, where the number of comparators and counters depends on the electronic design of the PCD and its application specific integrated circuits (ASICs). Each detected signal is compared with a voltage that has been calibrated to reflect a specified photon energy level (1032, 1034, and 1036), referred to as an energy threshold. When the energy level of a detected photon exceeds an energy threshold associated with a counter, the photon count is increased by one. In this manner, the number of photons that have energy equal to or greater than a specified energy level is measured. This process is enabled by the very fast ASIC, a key element in PCDs.

Figure 11:
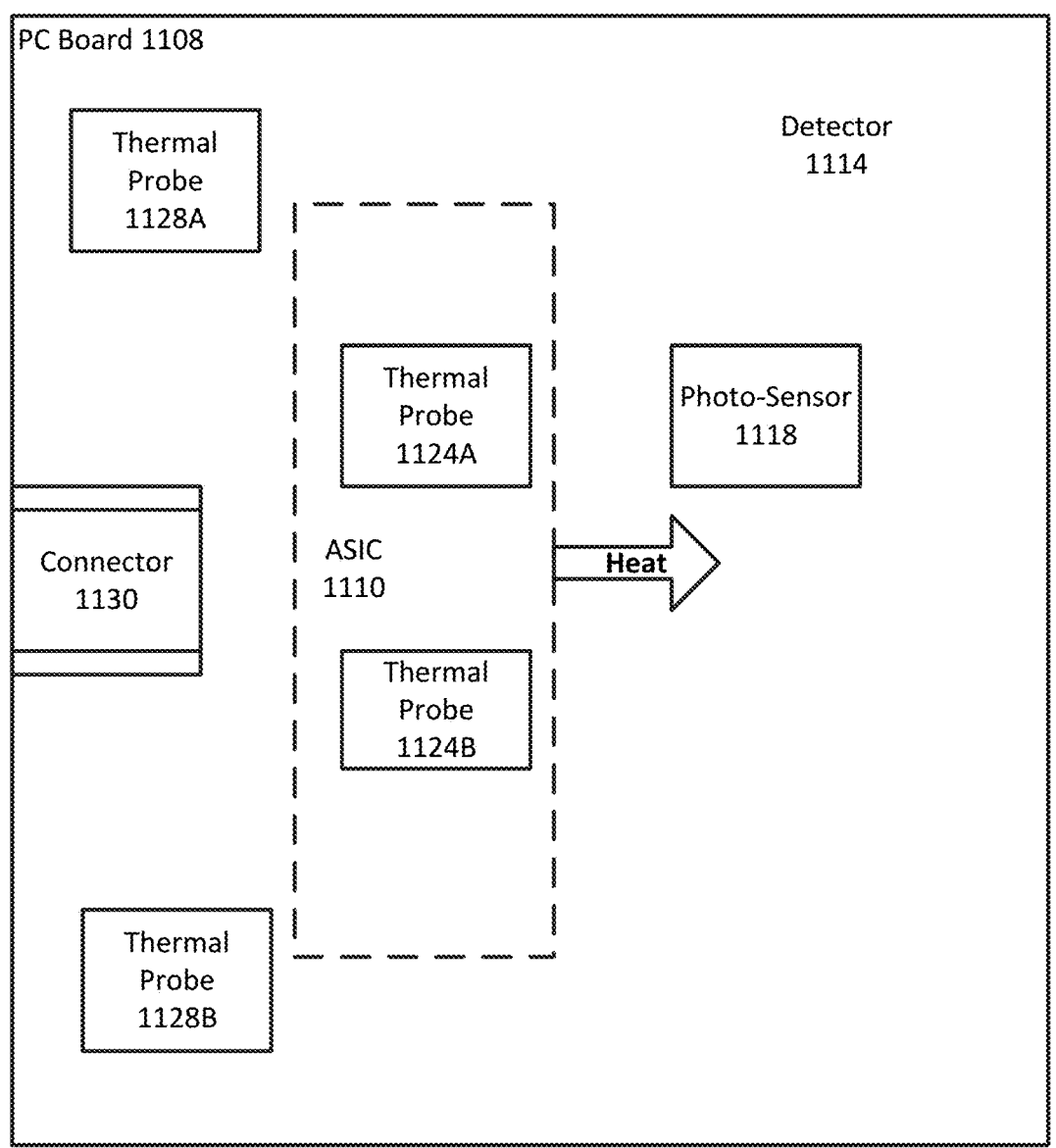
FIG. 11 is a block diagram of a detector apparatus according to one embodiment of the present disclosure.

FIG. 11 is a block diagram of a detector apparatus according to one embodiment of the present disclosure. The detector apparatus is an arrangement in which the photosensor is arranged on the PCB 1108. The detector includes an application-specific integrated circuit (ASIC) 1110, which includes signal processing circuitry, and a photosensor 1118 mounted near the ASIC 1110 on a PCB 1108. The photosensor 1118 is subject to heat transfer from the ASIC 1110. Thermal probes 1124A and 1124B can be included as part of the ASIC 1110, or thermal probes 1128A and 1128B can be mounted on the PCB 1108, but separate from the ASIC 1110. In one embodiment, a thermal probe can be arranged external to the PCB 1108.

One or more of the thermal probes 1124A and 1124B perform temperature readings indicating the temperature of the ASIC, and send the temperature readings to processing circuitry configured to estimate the temperature at the photosensor 1118, which is affected by a temperature flux from the ASIC 1110. Alternatively, or in addition to, one or more of the thermal probes 1128A and 1128B perform temperature readings, and send the temperature readings to the processing circuitry configured to estimate the temperature at the photosensor 1118. The processing circuitry can be located on the PC board, e.g., as part of the ASIC or separate from the ASIC, or, in other embodiments, can be located away from the PCB and connected to the ASIC 1110 by way of a connector 1130.

Figures 12A, 12B:
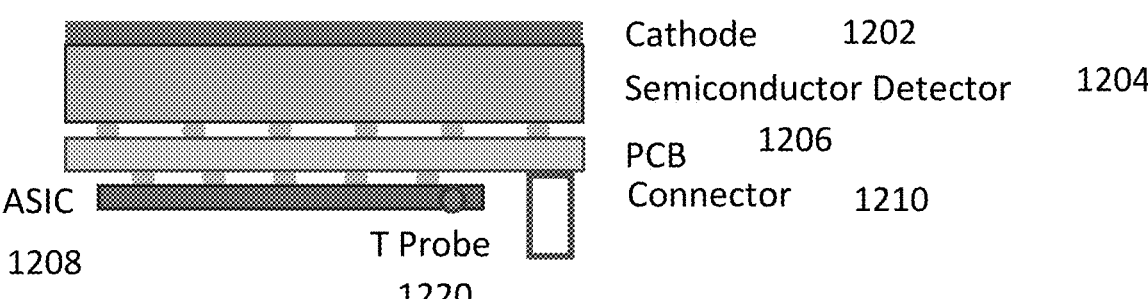
FIGS. 12A, 12B, 12C are block diagrams of embodiments of a radiation detector system.
Figure 12C:
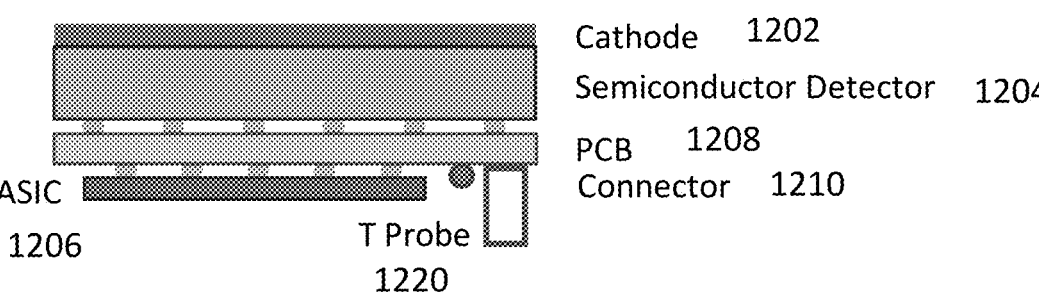

FIGS. 12A, 12B, 12C are block diagrams of embodiments of a radiation detector system 1200. The detector system 1200 includes semiconductor detector 1204, and a thermal probe 1220 located away from the semiconductor detector 1204. The detector system 1200 includes cathode 1202 and a connector 1210.

In FIG. 12A, the semiconductor detector 1204 is arranged on the ASIC 1208 and the thermal probe 1220 is in the ASIC 1208. In FIG. 12B, the semiconductor detector 1204 is arranged on the PCB 1206. The ASIC 1208 is arranged on a second side of the PCB 1206 with the PCB 1206 between the ASIC 1208 and the semiconductor detector 1204. In a similar manner, the thermal probe 1220 is in the ASIC 1208. In FIG. 12C, the semiconductor detector 1204 is arranged on the PCB 1208, with the thermal probe 1220 mounted on a second side of the PCB 1208 and separate from the ASIC 1206.

The thermal probe 1220 is located away from the semiconductor detector 1204 and periodically reports local measured temperature readings at a given reporting frequency. The given reporting frequency can be an interval that is on the order of every second, to every three to five seconds. Processing circuitry, located in the ASIC or away from the ASIC, processes the measured temperature readings as sequential temperature readings in real time, and generates a sequential digital output of estimated target temperature. The thermal probes 1224a are separately mounted on the circuit board 1212 on which the ASIC 1210 is mounted, and can also communicate temperature readings to the processing circuitry, which are used in the temperature estimation process. In either case, the thermal probes are mounted at locations that are away from the sensor.

The temperature estimation process includes a filter, for example, a digital low-pass filter in the time domain, that is applied to the measured temperature readings. The filtered output serves as an estimation of the target temperature of a temperature sensitive component, such as the detector element 1214 or a particular sensor 1218 within the detector element. As mentioned above, the temperature estimation process is preferably an impulse response function.

In one embodiment, the filter is implemented in the ASIC 1210. In an alternative embodiment, the filter used in determining the estimated temperature is implemented in external processing circuitry.

When the estimated temperature can be determined as a linear system, such as when the detector is in contact with the ASIC 1210, the temperature of the target temperature is a convolution with the impulse response function. In such case, the type of filter can include general types of filters such as finite impulse response (FIR), infinite impulse response (IIR) filters or low/band/high-pass filters in frequency domain. The choice of filter depends on factors such as distance between elements and type of materials, as well as the desired accuracy in estimation of the target temperature. In some embodiments, simpler types of filters can be used for certain cases and can include, but are not limited to: a delay filter and a moving average filter.

For types of filters in which the output is a noisy result, such as derivate of signal, frequency filters using a Fourier transform, an additional smoothing or regularization operation can be applied to maintain the stability of output from the filter.

When the thermal probe 1224 measures temperature with non-uniform intervals, the data can either be down-sampled or interpolated to a uniform interval for processing, or each temperature reading can be processed with an additional weight related to the immediate interval or the sampling frequency.

When the measured temperature is an analog signal, for example, a voltage signal, an analog filter, an RC low-pass filter or higher order filters, can be used to process the analog signal and generate an output equivalent, as if the temperature is measured at a non-local target location.

In one embodiment, for detector systems that have more than one component that is sensitive to temperature, multiple processing circuits can be implemented to share the same input temperature data and produce estimated temperatures for the different components.

When the detector and ASIC are separated, the thermal characteristics along the path are taken into account. In one embodiment, the signal processing unit 1220 can include additional functionality, as needed in specific cases.

In one embodiment, the processing logic and parameters can be configurable in order to provide different filtering behaviors for different applications and also for individual detectors. An example configurable parameter can include distance to a location to be measured.

In one embodiment, the processing logic and parameters for a given system are determined through experimental calibrations, simulations, or a combined method. The impulse response function of the heat path is measured first, the filter logic and the associated coefficients are then determined accordingly.

When a system in which temperature of the detector element cannot be easily measured, one experimental method is to use a well-defined temperature stimulus, for example, a ramp up, or a periodic oscillation, and check the corresponding change in detector response, for example, a shift in photopeak position in a PET detector. Then, fit a filter model based on a correlation between the temperature measured by the probe and the detector response.

In one embodiment, the estimated target temperature is used to compensate a detector's running condition, e.g., adjust the SiPM bias voltage or cooling fan speed, or correct a detector's signal due to its sensitivity to temperature.

The above-described hardware description is a non-limiting example of corresponding structure for performing the functionality described herein.

Applications other than a PET or CT detector that requires accurate real-time temperature reading could also benefit from the disclosed solution.

Numerous modifications and variations of the present disclosure are possible in light of the above teachings. It is therefore to be understood that within the scope of the appended claims, the invention may be practiced otherwise than as specifically described herein.

The invention claimed is:

1. A detection apparatus, comprising:
 a radiation sensor configured to receive radiation emitted from an object to be imaged, and output a detection signal corresponding to the received radiation;
 first processing circuitry arranged adjacent to the radiation sensor and configured to process the detection signal output by the radiation sensor;
 a board on which the first processing circuitry is mounted;
 a thermal probe configured to measure a temperature at a particular location on the first processing circuitry or on the board; and
 second processing circuitry configured to estimate a temperature of the radiation sensor based on the measured temperature from the thermal probe.

2. The detection apparatus of claim 1, wherein the first processing circuitry is an application specific integrated circuit (ASIC) and the thermal probe is arranged inside the ASIC.

3. The detection apparatus of claim 1, wherein the second processing circuitry is further configured to estimate the temperature of the radiation sensor based on the measured temperature and a thermal conductivity of a path between the particular location and the radiation sensor.

4. The detection apparatus of claim 1, wherein the radiation sensor is directly attached to the first processing circuitry.

5. The detection apparatus of claim 1, wherein the radiation sensor is a photon-counting detector configured to measure an energy spectrum of incident photons.

6. The detection apparatus of claim 1, wherein the second processing circuitry is further configured to estimate the temperature of the radiation sensor based on the measured temperature using an approximated impulse response function.

7. The detection apparatus of claim 1, wherein the second processing circuitry is further configured to control an operation of the radiation sensor based on the estimated temperature of the radiation sensor.

8. The detection apparatus of claim 1, wherein the second processing circuitry is further configured to estimate the temperature of the radiation sensor by:

receiving, from the thermal probe, a sequence of temperature readings; and applying a filter to the received sequence of temperature readings to output the estimated temperature of the radiation sensor.

9. The detection apparatus of claim 8, wherein the filter is one of a finite-impulse-response filter, an infinite-impulse-response filter, and a low-pass filter.

10. The detection apparatus of claim 8, wherein the filter is one of a delay filter and a moving average filter.

11. The detection apparatus of claim 8, wherein the sequence is a sequence having non-uniform intervals.

12. The detection apparatus of claim 8, wherein the probe is configured to output an analog signal representing the measured temperature and the filter is an analog filter.

13. A method for estimating a temperature of a radiation sensor configured to receive radiation emitted from an object to be imaged and to output a detection signal corresponding to the radiation, the method comprising:

receiving, from a thermal probe, a measured temperature at a particular location (1) on first processing circuitry arranged adjacent to the radiation sensor and configured to process the detection signal output by the radiation sensor, or (2) on a board on which the first processing circuitry is mounted; and estimating, by second processing circuitry, the temperature of the radiation sensor based on the measured temperature.

14. The method of claim 13, wherein the estimating step further comprises estimating the temperature of the radiation sensor based on the measured temperature and a thermal conductivity of a path between the particular location and the radiation sensor.

15. The method of claim 13, further comprising controlling an operation of the radiation sensor based on the estimated temperature of the radiation sensor.

16. A detection system, comprising:

a board on which is mounted:

a radiation sensor configured to receive radiation emitted from an object to be imaged, and to output a detection signal corresponding to the radiation, first processing circuitry arranged adjacent to the radiation sensor and configured to process the detection signal output by the radiation sensor;

a thermal probe mounted on the board and configured to measure a temperature at a particular location on the first processing circuitry or on the board; and second processing circuitry configured to receive the temperature measured by the thermal probe, and estimate a temperature of the radiation sensor based on the measured temperature at the particular location.

17. The detection system of claim 16, wherein the second processing circuitry is not located on the board.

\* \* \* \* \*